United States Patent
Wang et al.

(10) Patent No.: US 9,870,027 B2
(45) Date of Patent: Jan. 16, 2018

(54) MASS STORAGE DEVICE OPERATION

(71) Applicant: HEWLETT-PACKARD DEVELOPMENT COMPANY, L.P., Houston, TX (US)

(72) Inventors: Kevin Yun-Hsiang Wang, Taipei (TW); Shih-Jung (Shawn) Huang, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 53 days.

(21) Appl. No.: 14/786,271

(22) PCT Filed: May 31, 2013

(86) PCT No.: PCT/US2013/043596
§ 371 (c)(1),
(2) Date: Oct. 22, 2015

(87) PCT Pub. No.: WO2014/193408
PCT Pub. Date: Dec. 4, 2014

(65) Prior Publication Data
US 2016/0077549 A1    Mar. 17, 2016

(51) Int. Cl.
*G06F 1/26* (2006.01)
*G06F 1/16* (2006.01)
*G06F 1/30* (2006.01)
*G06F 13/40* (2006.01)

(52) U.S. Cl.
CPC .............. *G06F 1/1632* (2013.01); *G06F 1/30* (2013.01); *G06F 13/4081* (2013.01)

(58) Field of Classification Search
None
See application file for complete search history.

(56) References Cited

U.S. PATENT DOCUMENTS

| | | | |
|---|---|---|---|
| 6,604,199 B1 | 8/2003 | Yang et al. | |
| 7,380,143 B2 | 5/2008 | Gold et al. | |
| 8,310,490 B2 | 11/2012 | Zaczek et al. | |
| 8,653,785 B2 * | 2/2014 | Collopy | G06F 1/1624 307/43 |
| 9,337,661 B2 * | 5/2016 | Coakley | H02J 4/00 |
| 2006/0152484 A1 | 7/2006 | Rolus Borgward | |
| 2006/0171112 A1 | 8/2006 | Lev | |
| 2009/0043936 A1 | 2/2009 | Yang et al. | |

(Continued)

FOREIGN PATENT DOCUMENTS

CN    202887178 U    4/2013
TW    M309133    4/2007
(Continued)

OTHER PUBLICATIONS

Man-In Baek, "Thermal Design for Notebook PC by Using Thermal Analysis," 18th IEEE/CPMT Int'l, Dec. 4-6, 1995

*Primary Examiner* — Cheng-Yuan Tseng
(74) *Attorney, Agent, or Firm* — HP Inc. Patent Department

(57) ABSTRACT

Activation of a release button is detected, where the release button is to separate a tablet computing device from a docking station while a mass storage device of the docking station is performing an operation. In response to the detection, power is maintained to the mass storage device from a battery of the docking station to complete the operation.

14 Claims, 4 Drawing Sheets

(56) References Cited

U.S. PATENT DOCUMENTS

2010/0295384 A1   11/2010  Kobayashi
2010/0332711 A1   12/2010  Li et al.
2012/0203949 A1   8/2012   Berhard
2012/0311216 A1   12/2012  Chen

FOREIGN PATENT DOCUMENTS

TW   201250478 A   12/2012
TW   M453892      5/2013

* cited by examiner

MASS STORAGE DEVICE OPERATION

BACKGROUND

Portable computing systems come in different sizes, shapes, and features. Some portable computes are notebook configurations with a keyboard housing and a display housing connected by a hinge. Other portable computers are in a tablet configuration that uses a single touchscreen display and housing for both accepting user input and displaying images to an operating user. Convertible notebook computers have an integrated keyboard that can be hidden by a swivel joint or a slide joint, exposing only the screen for touch operation. Hybrid computers have a detachable keyboard so that fee touch screen can be used as a stand-alone tablet.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
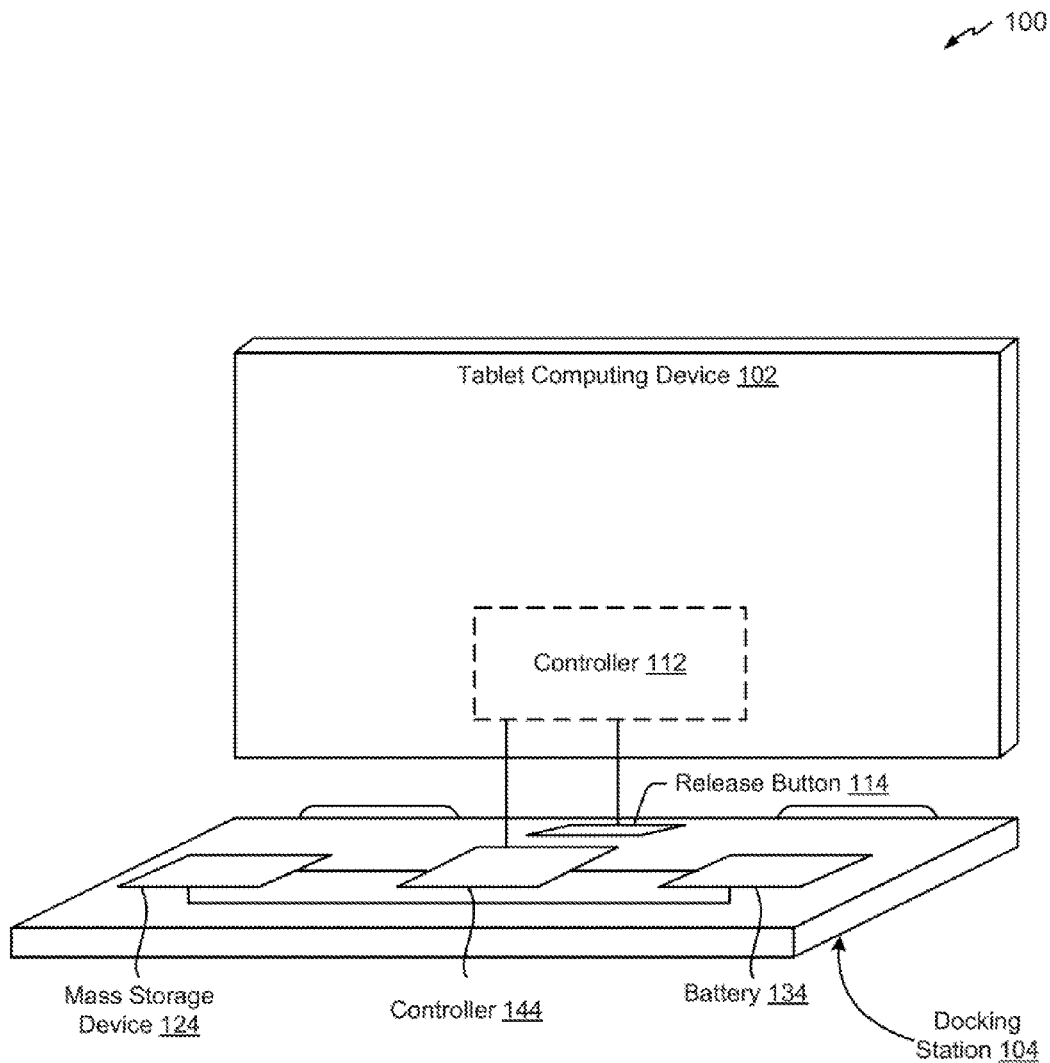
FIG. 1 is a block diagram of a computing system including a tablet computing device and a docking station, according to one example.

A hybrid notebook computer includes two parts, a tablet and a docking station. Fasteners can hold fee tablet to the docking station. For example, the fasteners may be hooks that are engaged with detents in the tablet when the tablet is attached to the docking station. To detach the tablet from the docking station, the fasteners have to be released from the detents in the tablet. The release is to detach the fasteners (e.g., latch, hook, magnet, mount, and/or a locking mechanism to couple the tablet to the docking station) that hold the tablet to the docking station. The release may be, for example, a button or a slide switch.

The tablet is a personal computer that may be operated by a touchscreen, where the user's finger may function as the mouse and cursor, removing the need for a separate mouse. An onscreen, virtual keyboard may be displayed on the display, removing the need for a traditional keyboard.

The tablet is often thinner and lighter than a notebook computer that includes a keyboard at the base since the tablet forgoes the physical keyboard. Thus, the tablet can be used holding the tablet with one or two hands and therefore may be thinner and lighter than a notebook computer. Further, a notebook computer often includes a hard disk drive and a battery in the base of the notebook, however, a tablet may not include a hard disk drive due to the size of the hard disk drive, the power capacity of the battery in the tablet, or the weight of the hard disk drive. Instead, a tablet may use a solid state non-volatile memory such as a flash memory. Flash memory may be for example 32, 64, 128 or more gigabytes, bat hard disk drives may be 1 terabyte or more and cost significantly less.

A docking station may provide the tablet with multiple peripherals and ports when, the tablet is connected to the docking station. Moreover, the docking station enables computing system to function like a notebook when the tablet is connected to the docking station. Thus, the tablet may be compatible with a docking station that includes a keyboard. The keyboard enables the user to provide input for the tablet similar to that of a notebook or desktop computer. To increase storage available to the tablet, a mass storage device such as a hard disk drive can be added to the docking station. The tablet may communicate with the mass storage device through an electrical, optical, or other physical connection. Accordingly, the tablet may access the mass storage device of the docking station to perform read and write operations, for example. However, during such access a user may detach the tablet from the docking station which may damage the mass storage device. For example, a read/write head of the mass storage device may be damaged if the read/write head is not parked properly when the tablet is separated from the docking station during an access operation.

Accordingly, examples disclosed herein address the above challenges by leveraging a battery in the docking station to provide extended power to the mass storage device to provide sufficient time to safely shut down the mass storage device if the tablet is separated from the docking station during an access operation.

In one example, a computing system includes a tablet computing device and a docking station to couple to the tablet computing device, where the docking station includes a mass storage device and a battery. The docking station includes a release to separate the tablet computing device from the docking station, and a controller to control power to the mass storage device via the battery if the tablet computing device is separated from the docking station while the mass storage device is performing an operation.

In another example, a method includes detecting that a release button of a docking station is activated to separate a tablet computing device from the docking station while a mass storage device of the docking station is performing an operation. The method also includes maintaining power to the mass storage device from a battery of the docking station to complete the operation in response to the detection.

In another example, a non-transitory computer-readable storage medium includes instructions that, when executed by a controller of a docking station, causes the controller to detect whether a release button is activated to separate a tablet computing device from the docking station while an access operation to a mass storage device of the docking station is in progress. The instructions are executable to enable power to the mass storage device to complete the access operation if the tablet computing device is separated from the docking station, and disable power to the mass storage device upon completion of the access operation.

With reference to the figures, FIG. 1 is a block diagram of a computing system including a tablet computing device and a docking station, according to one example. A computing system 100 can include a tablet computing device 102 and a docking station 104.

Docking station 104 can removable connect to the tablet 102. Accordingly, docking station 104 can include a release 114 to separate the tablet 102 from the docking station 104. Release 114 may be, for example, a button, a slide switch, or another type of release. In one example, the release 114 may be located on the tablet 104 rather than on the docking station 104. Docking station 104 can include a mass storage device 124 and a battery. Mass storage device 124 may provide large storage capacity for the computing system 101. Mass storage device 124 may include storage capacity that far exceeds the storage capacity available in the tablet 102. Mass storage device 124 may be, for example, a hard disk drive (HDD), a solid state drive (SDD), an optical drive, or another mass storage drive. A controller 144 in the docking station can be connected to the mass storage device 124 and to a battery 134. Controller 144 may provide access to the mass storage device 124 from the tablet 102.

Tablet 102 can include a second controller 112 and a display device (not shown). The display device may be a touch screen for input to the tablet 102. Controller 112 is internal to the tablet 102 and is therefore shown in dotted lines. Controller 112 may be a general purpose processor, for example. Controller 112 may communicate with the docking station 104. Further, controller 112 may control read/write operations of the tablet 102 to the mass storage device 124 of the docking station 104. Further, controller 112 of the tablet 102 may detect when the release 114 is activated to separate the tablet 102 from the docking station 104. Thus, release 114 can include an activation sensor (e.g., an electrical sensor, a mechanical sensor).

Accordingly, when the release 114 is activated to separate the tablet 102 from the docking station 104, the sensor of the release 114 may send a signal to the controller 112 of the tablet 102 that causes the controller 112 to send a command to the controller 144 of the docking station to maintain power to the mass storage device 124 to prevent damage to the mass storage device 124.

For example, if a read/write head of the mass storage device 124 is performing at least one of a read/write operation initiated by the tablet 102 and the tablet 102 is separated from the docking station 104 causing the mass storage device 124 to lose power, the mass storage device 124 may be damaged because the read/write head is not property parked. To prevent damage to the mass storage device 124, the controller 144 is instructed to control power to the mass storage device 124 from the battery 134 of the docking station 104 to provide extended power to the mass storage device 124 to allow sufficient time to park the read/write head of the mass storage device 124. It should be noted that in certain examples, the controller 144 of the docking station may receive the signal directly from the release 114 indicating that the tablet 102 is to be separated from the docking station, and in response, maintain power to the mass storage device 124 to prevent damage to the mass storage device 124. Thus, in such examples, controller 144 of the docking station 104 does not receive the instruction to control power to the mass storage device 124 from the controller 112 of the tablet 102.

Figure 2:
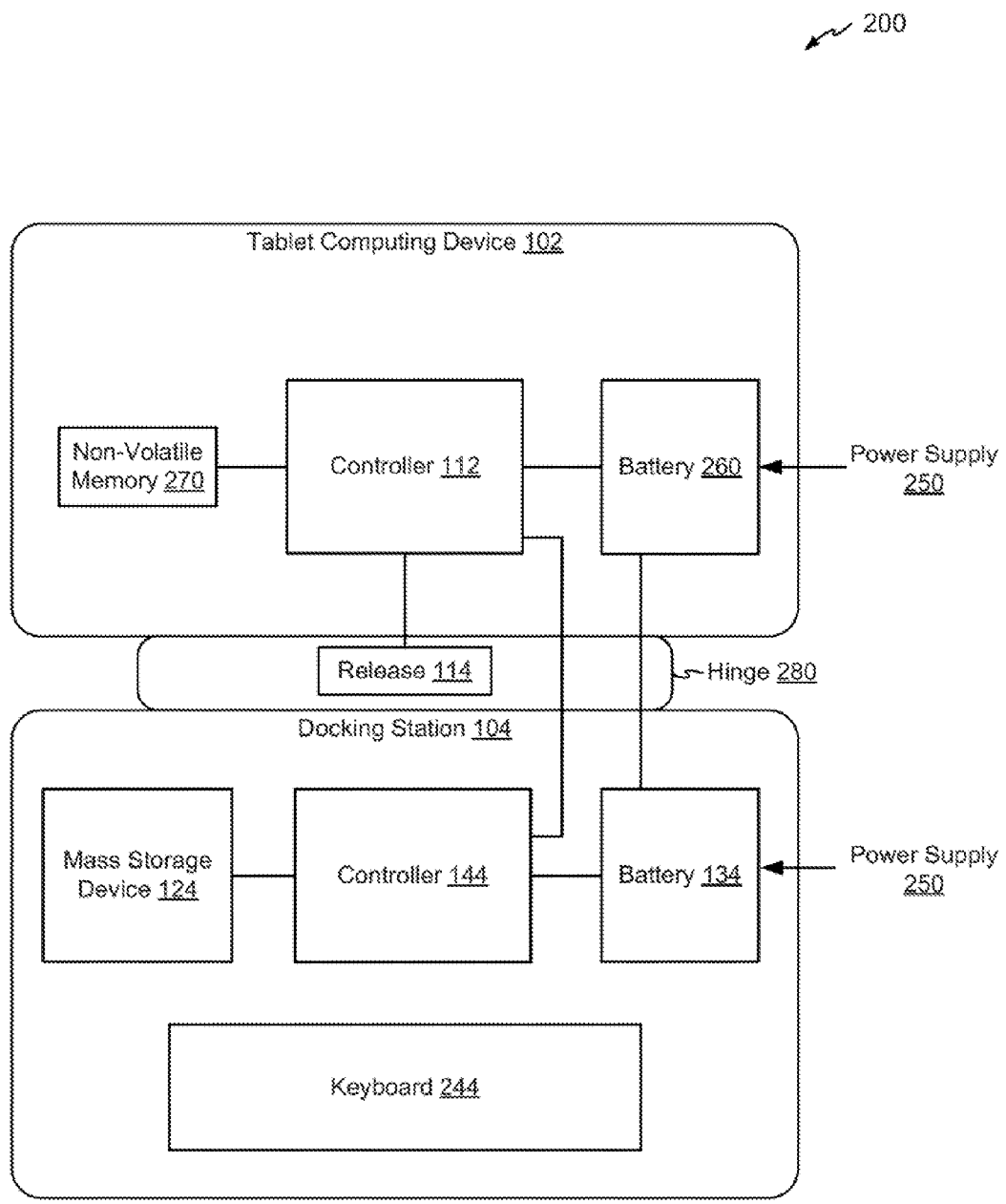
FIG. 2 is a block diagram of a computing system including a tablet computing device and a docking station, according to one example.

FIG. 2 is a block diagram of a computing system including a tablet computing device and a docking station, according to one example. The docking station 104 can include a hinge 280 to allow the tablet computing device 102 to pivot relative to the docking station 104 if the tablet 102 is connected to the docking station 104. The hinge 280 can include the release 114. The release 114 may be, for example, a button, a slide switch or another type of release. The release 114 may include an activation sensor. The activation sensor may send a signal to one of the controller 144 of the docking station 104 and the controller 112 of the tablet 102 when the release 114 is being activated to uncouple the tablet 102 from the docking station 104.

Controller 144 can provide power to the mass storage device 124 from the battery 134 to complete an access operation to the mass storage device 124 and/or to safely shut off the mass storage device 124 when the release 114 is activated to separate the tablet 102 from the docking station 104.

Computing system 200 can include a power supply 250 (e.g., AC adapter) to charge at least one of the battery 260 of the tablet 102 and the battery 134 of the docking station. Thus, computing system 200 may include at least two batteries, one in the tablet 102 and another in the docking station 104. In one example, when the tablet 102 is separated from the docking station 104, power supply 250 can charge either the battery 260 of the tablet 102 or the battery 124 of the docking station 104. In another example, the power supply 250 can charge both battery 260 of the tablet 102 and battery 134 of the docking station 104 when the tablet 102 is coupled to the docking station 104 (e.g., plugging an AC adapter to either tablet 102 or docking station 104). In still another example, the battery 250 of the tablet 102 may charge the battery 134 of the docking station 104 when the power supply 250 is not connected and the tablet 102 is coupled to the docking station 104. In this example, battery 134 of the docking station 104 is able to provide power to the mass storage device 124 when the tablet 102 is separated from the docking station 104 during an access operation.

Docking station 104 may include a keyboard 244. While the docking station 104 is shown, to include the keyboard 244, the docking station 104 may include other input devices (e.g., touchpad) other than the keyboard 244 and may not include the keyboard 244. For example, the docking station 104 may have a point of sale feature for scanning credit cards and not include a physical keyboard. Keyboard 244 may be a "QUERTY" keyboard or another type of keyboard. The docking station may include additional ports, storage, or another component usable by the tablet 102 when docked to the docking station 104. For example, docking station 104 may include a Universal Serial Bus (USB) port, an HDMI port, or another type of port. The docking station 104 may include other components or features such as a card reader for reading ID car or another type of card reader.

The tablet computing device 102 can include a non-volatile memory 270 such as a flash memory (e.g., 32, 64, 128 or more gigabytes). However, tablet 102 may also include a mass storage device. Further tablet 102 may include a USB port, an HDMI port, or another type of port.

Figure 3:
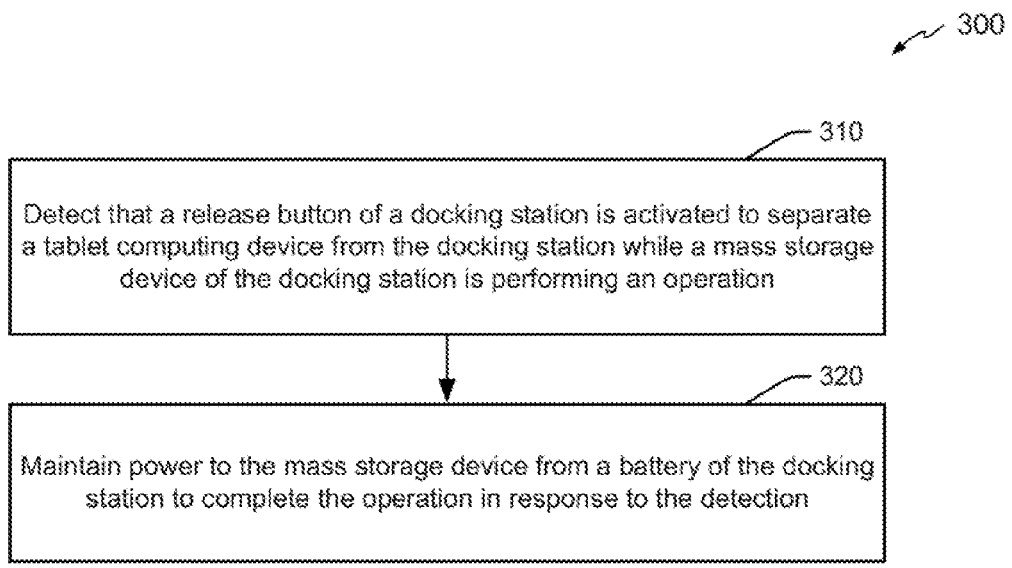
FIG. 3 is a flowchart of a method for controlling power to a mass storage device of a docking station, according to one example.

FIG. 3 is a flowchart of a method for controlling power to a mass storage device of a docking station, according to one example. Method 300 may be implemented in the form of executable instructions stored on a non-transitory computer-readable storage medium and/or in the form of electronic circuitry.

Method 300 includes detecting that a release button of a docking station is activated to separate a tablet computing device from the docking station while a mass storage device of the docking station, is performing an operation, at 310. Method 300 also includes maintaining power to the mass storage device from a battery of the docking station to complete the operation, at 320. In one example, controller 112 of the tablet 102 may detect that the release 114 has been activated to separate the tablet 102 from the docking station 104. In this example, an activation sensor in the release 114 may send a signal to the controller 112 of the tablet 102. The controller 112 of the tablet 102 may notify the controller 144 of the docking station 104 so that power may be maintained in the mass storage device 124 of the docking station 104 to prevent damage to the mass storage device 124.

In another example, controller 144 of the docking station 104 may detect that the release 114 has been activated to separate the tablet 102 from the docking station. In this example, the activation sensor in the release 114 may send, a signal to the controller 144 of the docking station 104, and in response, the controller 144 manages power to the mass storage device 124 from the battery 134 of the docking station 104.

Figure 4:
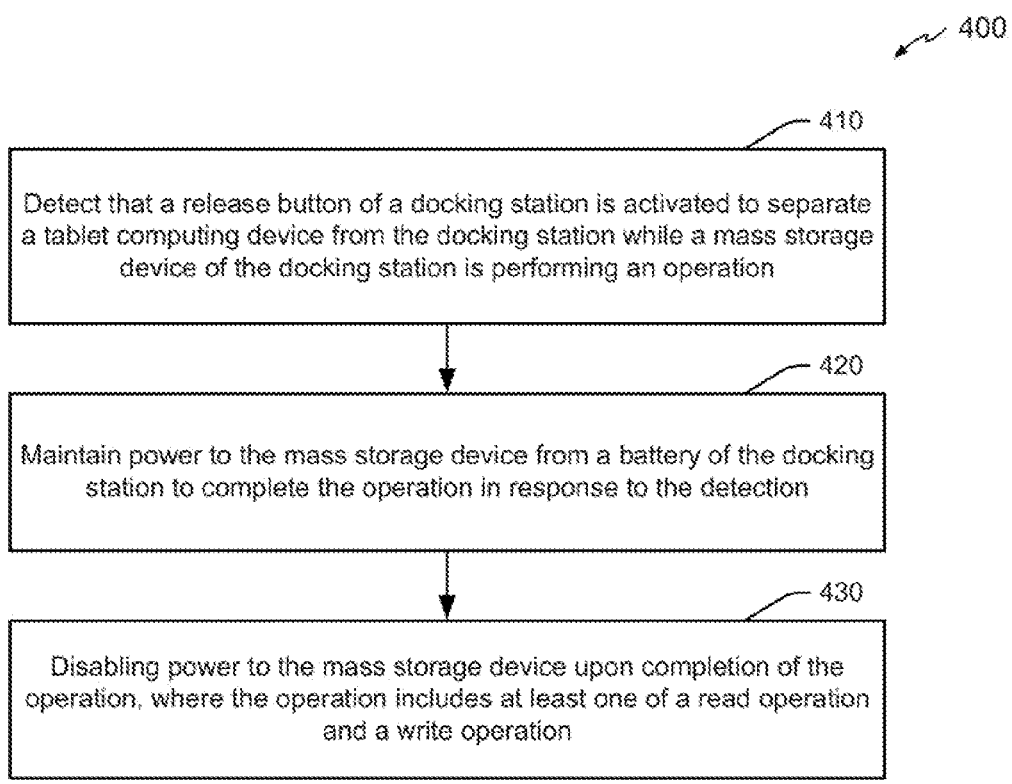
FIG. 4 is a flowchart of a method for controlling power to a mass storage device of a docking station, according to one example.

FIG. 4 is a flowchart of a method for controlling power to a mass storage device of a docking station, according to one example. Method 400 may be implemented in the form of executable instructions stored on a non-transitory computer-readable storage medium and/or in the form of electronic circuitry.

Method 400 includes detecting that a release button of a docking station is activated to separate a tablet computing device from the docking station while a mass storage device of the docking station is performing an operation, at 410. For example, a sensor in the release 114 may detect that the release 114 is activated to separate the tablet 102 from the docking station 104. The method 400 includes maintaining power to the mass storage device from a battery of the docking station to complete the operation, at 420. For example, controller 144 of the docking station 104 may control power to the mass storage device 124 from the battery 134 of the docking station 104 to complete at least one of a read access and a write access to the mass storage device 124 and/or to properly park a read/write head of the mass storage device 124 to prevent damage to the mass storage device 124. Method 400 also includes disabling power to the mass storage device upon completion of the operation, at 430. For example, the controller 144 of the docking station 104 can safely shut down the mass storage device 124.

Figure 5:
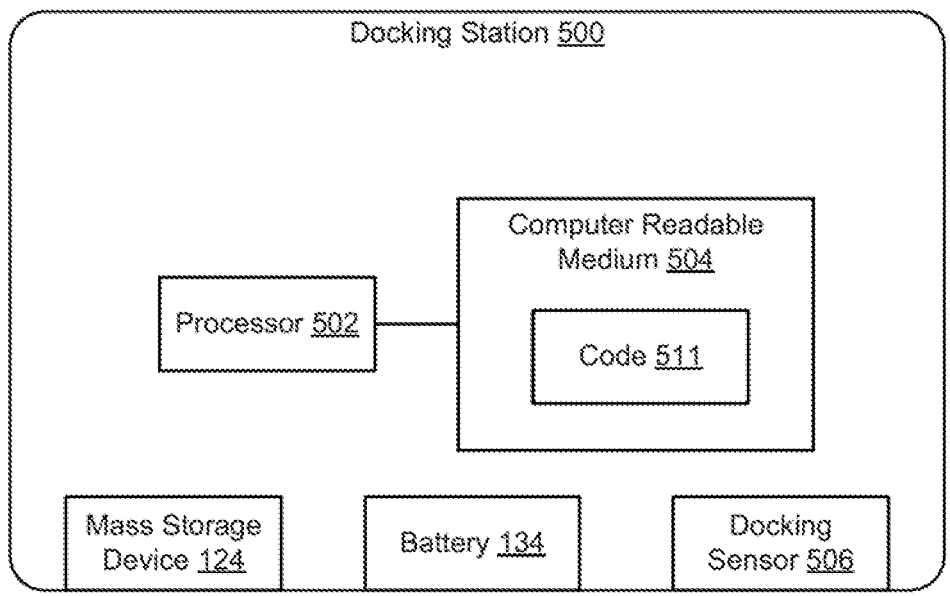
FIG. 5 is a block diagram of a docking station including a computer-readable medium, according to one example.

FIG. 5 is a block diagram of a docking station including a computer-readable medium, according to one example. The docking station 500 can include a non-transitory computer-readable medium 504. The non-transitory computer-readable medium can include code 511 that if executed by a processor 502 can cause the processor 502 to maintain power to the mass storage device 124 when the tablet 102 is separated from the docking station 500 during an operation of the mass storage device 124. To maintain power to the mass storage device 124, the processor 502 can detect that the release 114 is activated to separate the tablet 102 from the docking station 500 while a read/write operation to the mass storage device 124 is in progress with a sensor 506. If the read/write head of the mass storage device 124 is not properly parked during this separation and power is removed from the mass storage device 124 (due to the separation), the mass storage device 124 may be damaged. Accordingly, damage to die mass storage device 124 can be prevented by providing power to the mass storage device 124 from the battery 134 to properly park the read/write head, for example.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of examples, those skilled in the art will appreciate numerous modifications and variations therefrom. It is intended that the appended, claims cover such modifications and variations as fall within the true spirit and scope of the invention.

What is claimed is:

1. A computing system comprising:
   a tablet computing device including a first battery and second battery;
   a docking station to couple to the tablet computing device, the docking station comprising:
     a mass storage device storing data accessible from the tablet computing device; and
     a battery;
   a release in the docking station to separate the tablet computing device from the docking station;
   a controller in the docking station to:
     receive a signal from the release that the tablet computing device is to be separated from the docking station during performance of an operation by the mass storage device; and
     maintain power to the mass storage device via the battery in response to the received signal; and
   a power supply to:
     charge one of the battery of the docking station and the second battery of the tablet computing device when the tablet computing device is separated from the docking station; and
     charge the battery of the docking station and the second battery of the tablet computing device when the tablet computing device is connected to the docking station, wherein the second battery of the tablet computing device charges the battery of the docking station when the power supply is not connected to the docking station.

2. The computing system of claim 1, wherein the release comprises an activation sensor, and wherein the activation sensor comprises at least one of an electrical sensor and a mechanical sensor.

3. The computing device of claim 2, further comprising a second controller in the tablet computing device to:
   receive an indication from the activation sensor that the release is activated to separate the tablet computing device from the docking station; and
   send a command to the controller in the docking station to maintain power to the mass storage device.

4. The computing device of claim 2, wherein the activation sensor is to detect at least one of a command and an action to separate the tablet computing device from the docking station.

5. The computing device of claim 1, wherein the controller is to maintain power to the mass storage device from the battery to safely shut down the mass storage device after completion of the operation.

6. The computing system of claim 1, further comprising a keyboard in the docking station.

7. The computing system of claim 1, further comprising a hinge to allow the tablet computing device to pivot relative to the docking station if the tablet computing device is connected to the docking station, wherein the hinge includes the release.

8. The computing system of claim 1, wherein the operation of the mass storage device comprises at least one of a read access operation and a write access operation.

9. The computing system of claim 1, wherein the tablet computing devices further includes a non-volatile memory.

10. A method comprising:
   determining that a docking station including mass storage device is coupled to a power supply, wherein the mass storage device includes data accessible by a tablet computing device;
   determining that the tablet computing device is coupled to the docking station, wherein:
      the tablet computing device includes a first battery and a second battery; and
      a battery of the docking station and the second battery of the tablet computing device are charged when the tablet computing device is connected to the docking station, wherein the second battery of the tablet computing device charges the battery of the docking station when the power supply is not connected to the docking station;
   determining that the mass storage device is performing an operation;
   detecting that a release button of the docking station is activated to separate the tablet computing device from the docking station while the mass storage device is performing the operation;
   maintaining power to the mass storage device from a battery of the docking station to complete the operation in response to the detection;
   charging one of the battery of the docking station and the second battery of the tablet computing device in response to detection that the release button of the docking station is activated to separate the tablet computing device from the docking station; and
   terminating power to the mass storage device upon completion of the operation.

11. The method of claim 10, further comprising disabling power to the mass storage device upon completion of the operation, wherein the operation includes at least one of a read operation and a write operation.

12. The method of claim 10,
   wherein the detecting step comprises receiving a signal from the release button indicating that the tablet computing device is to be separated from the docking station, wherein the release button includes a sensor, and
   wherein the maintaining step comprising enabling power to the mass storage device from the battery to complete the operation prior to shutting down the mass storage device.

13. A non-transitory computer-readable storage medium comprising instructions that, when executed by a controller of a docking station, causes the controller to:
   determine that the docking station is coupled to a power supply;
   determine that a tablet computing device is coupled to the docking station, wherein:
      the tablet computing device includes a first battery and a second battery; and
      a battery of the docking station and the second battery of the tablet computing device are charged when the tablet computing device is connected to the docking station, wherein the second battery of the tablet computing device charges the battery of the docking station when the power supply is not connected to the docking station;
   detect that a release button is activated to separate a tablet computing device from the docking station while an access operation to a mass storage device of the docking station is in progress, wherein the mass storage device includes data accessible by the tablet computing device;
   determine that the access operation of the mass storage device is incomplete;
   enable power from the power supply to the mass storage device to complete the access operation in response to separation of the tablet computing device and the docking station, wherein the instructions to enable power from the power supply further comprise instructions to charge one of the battery of the docking station and the second battery of the tablet computing device in response to the separation of the tablet computing device and the docking station; and
   disable power from the power supply to the mass storage device upon completion of the access operation.

14. The non-transitory computer-readable storage medium of claim 13, wherein power is provided by a battery of the docking station to the mass storage device for a predetermined time sufficient to safely shut down the mass storage device.

* * * * *